United States Patent
Sugitani

(10) Patent No.: US 9,209,664 B2
(45) Date of Patent: Dec. 8, 2015

(54) VEHICLE ROTATING ELECTRICAL MACHINE AND CAP STRUCTURE OF PULLEY FOR THE SAME

(75) Inventor: Katsuhiko Sugitani, Kariya (JP)

(73) Assignee: DENSO CORPORATION, Kariya (JP)

( * ) Notice: Subject to any disclaimer, the term of this patent is extended or adjusted under 35 U.S.C. 154(b) by 561 days.

(21) Appl. No.: 13/539,866

(22) Filed: Jul. 2, 2012

(65) Prior Publication Data

US 2013/0012346 A1 Jan. 10, 2013

(30) Foreign Application Priority Data

Jul. 10, 2011 (JP) ................................. 2011-152404

(51) Int. Cl.
*F16H 55/36* (2006.01)
*H02K 7/10* (2006.01)

(52) U.S. Cl.
CPC .............. *H02K 7/1004* (2013.01); *F16H 55/36* (2013.01)

(58) Field of Classification Search
CPC .... F16H 55/36; F16H 2055/366; F16H 55/44
USPC .......................................................... 474/166
See application file for complete search history.

(56) References Cited

U.S. PATENT DOCUMENTS

| | | | |
|---|---|---|---|
| 4,793,457 A * | 12/1988 | Siewert et al. ................ | 192/112 |
| 5,275,577 A * | 1/1994 | Hildebrandt et al. .......... | 474/174 |
| 5,601,504 A * | 2/1997 | Rocca et al. .................... | 474/91 |
| 6,048,284 A * | 4/2000 | Gerhardt et al. .............. | 474/178 |
| 7,909,717 B2 * | 3/2011 | Boussaguet et al. .......... | 474/136 |
| 2011/0043083 A1 | 2/2011 | Hamada et al. | |
| 2013/0267361 A1 * | 10/2013 | Cali et al. ........................ | 474/70 |

FOREIGN PATENT DOCUMENTS

| | | |
|---|---|---|
| JP | A-2002-21982 | 1/2002 |
| JP | A-2003-4121 | 1/2003 |
| JP | A-2003-232434 | 8/2003 |
| JP | A-2005-315267 | 11/2005 |
| JP | A-2006-234008 | 9/2006 |

(Continued)

OTHER PUBLICATIONS

Japanese Office Action issued in Japanese Patent Application No. 2011-152404 dated Apr. 23, 2013 (w/partial translation).

(Continued)

*Primary Examiner* — William E Dondero
*Assistant Examiner* — Mark K Buse
(74) *Attorney, Agent, or Firm* — Oliff PLC

(57) ABSTRACT

A vehicle rotating electrical machine includes a pulley unit and a cap that covers an opening portion of the pulley unit. The pulley unit includes a pulley shaft that has a hollow cylindrical shape and is mechanically connected to a rotation shaft. On an inner peripheral surface of the pulley shaft, a polygonally-shaped hole portion, a first and a second circular hole portions, and an inner diameter thread portion are formed. The cap includes a planar section and a plurality of pillar sections. The planar section covers the opening portion. The pillar sections extend from the planar section to the inner diameter thread portion, and include a bulge portion that bulges outward in a radial direction of the pulley shaft. The bulge portion is located at a position corresponding to the second circular hole portion in a state where the opening portion is covered by the planar section.

8 Claims, 4 Drawing Sheets

(56) References Cited

FOREIGN PATENT DOCUMENTS

| JP | A-2007-278405 | 10/2007 |
|---|---|---|
| JP | A-2009-162332 | 7/2009 |
| JP | A-2011-45170 | 3/2011 |

OTHER PUBLICATIONS

Office Action issued in Japanese Patent Application No. 2011-152404 dated Dec. 3, 2013 (with translation).
Japanese Office Action issued in Japanese Patent Application No. 2011-152404 dated Jul. 30, 2013 w/translation.

* cited by examiner

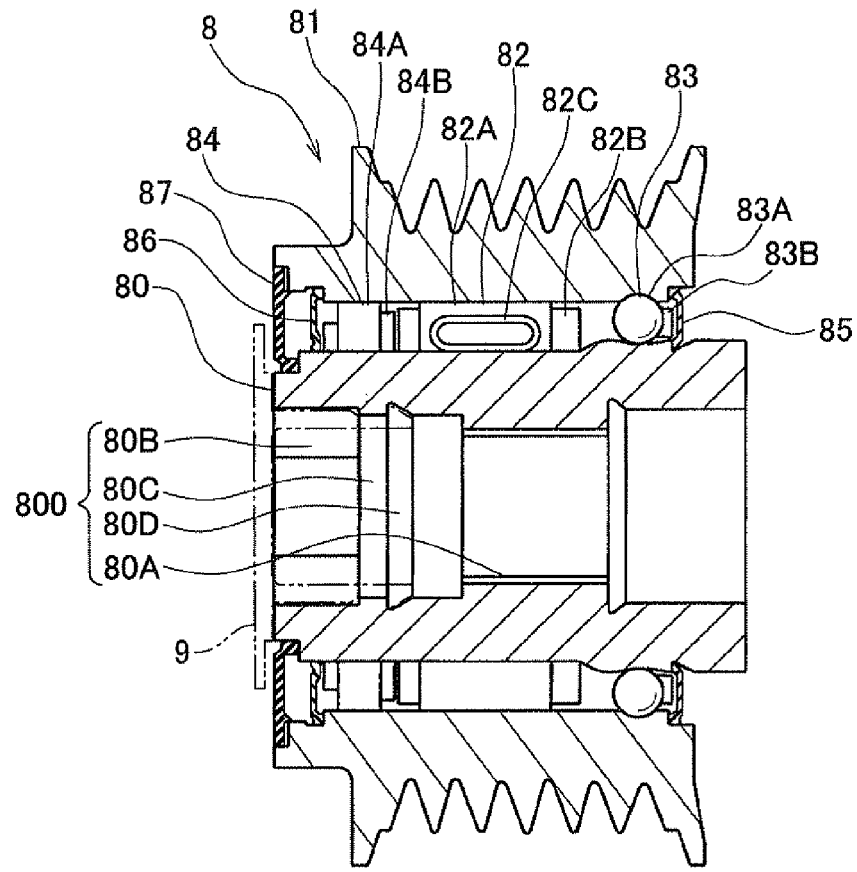

VEHICLE ROTATING ELECTRICAL MACHINE AND CAP STRUCTURE OF PULLEY FOR THE SAME

CROSS-REFERENCE TO RELATED APPLICATION

This application is based on and claims the benefit of priority from earlier Japanese Patent Application No. 2011-152404 filed Jul. 10, 2011, the description of which is incorporated herein by reference.

BACKGROUND OF THE INVENTION

1. Technical Field of the Invention

The present invention relates to a vehicle rotating electrical machine mounted on vehicles such as passenger cars or trucks, and in particular, to a cap structure of a pulley unit for the vehicle rotating electrical machine.

2. Related Art

As one example of the related art, a pulley unit with an integrated one-way clutch, which is able to be mounted in auxiliary machines for a vehicle, has been known (see, e.g., JP-A-2003-004121). In this pulley unit, a polygonally-shaped hole portion is formed so as to open on an axial end surface of a rotor shaft. In the hole portion, a jig for attachment is fitted so as to attach the rotor shaft to the auxiliary machine for the vehicle.

As the other example of the related art, a pulley unit with an integrated one-way clutch, which is mounted in a rotating electrical machine for a vehicle, has been also known (see, e.g., JP-A-2011-045170). This pulley unit is configured to perform at least one of transmission and reception of a rotation drive force to and from a rotation shaft of a rotor. The pulley unit includes a cap attached to an opening portion formed on an axial front end of the pulley unit. When the cap is attached to the pulley unit, internal pressure of the pulley unit increases. In order to reduce the internal pressure, an air passage is formed so as to ventilate an internal space of the pulley unit closed by the cap.

In the pulley unit disclosed in JP-A-2003-004121, due to moisture or water, rust may occur on an end face and inner face of the polygonally-shaped hole portion which is a an exposed portion of metal, thereby decreasing value of the vehicle (i.e., aesthetic appearance of surrounding part of an engine). In general, a rust prevention process such as an antirust coating is implemented for the exposed portion of metal, which makes it possible to suppress occurrence of rust.

If the rust prevention process is performed for the exposed portion of metal in the pulley unit, a coating material etc. can be attached to a seal of a bearing of the pulley unit, which makes it difficult to implement the rust prevention process for a local portion avoiding the seal and a concave surface of the polygonally-shaped hole portion. For these portions, the rust prevention process requires more man-hours (time and effort). However, this is impractical because costs are significantly increased.

The rust prevention process may be performed for a pulley shaft itself which is in a state before the seal is provided therein. In this case, coating material may be accidentally removed in the subsequent assembly process. The rust prevention process is required to be performed after the pulley unit is mounted on the accessory, in order to obtain sufficient effect thereof.

In the structure disclosed in JP-A-2011-045170, the cap is attached to the pulley unit and then an inside of the pulley unit is unexposed. This is effective in maintaining aesthetic appearance of the pulley unit. When the cap is attached to the pulley unit, the internal pressure is decreased, and then, the cap is needed to be assembled with high accuracy in order to maintain high level of air tightness. On attachment of the cap, an outer pulley of the pulley unit may be subjected to excessive loading which adversely affects the clutch mechanism inside the pulley unit. In order to avoid this situation, dedicated equipment for attaching the cap is required, and management of an assembly process becomes more complicated, which leads to an increase in cost.

SUMMARY

The present disclosure provides a cap structure of a vehicle rotating electrical machine which is able to easily attach a cap to a pulley unit and to prevent an opening portion of the pulley unit from being exposed.

According to an exemplary aspect of the present disclosure, there is provided a vehicle rotating electrical machine, comprising: a pulley unit that is mechanically connected to a rotation shaft of the vehicle rotating electrical machine; and a cap that covers an opening portion which opens on an axial end surface of the pulley unit.

The pulley unit has a pulley shaft that has a hollow cylindrical shape and is mechanically connected to the rotation shaft. The pulley shaft has an inner peripheral surface on which a polygonally-shaped hole portion, a first circular hole portion, a second circular hole, and an inner diameter thread portion are formed. The polygonally-shaped hole portion has a polygonal shape in cross-section and is located at a side of the opening portion along an axial direction of the pulley shaft. The first circular hole portion has a circular shape in cross-section and is adjacent to the polygonally-shaped hole portion along the axial direction. The second circular hole portion has a circular shape in cross-section larger than the first circular hole portion and is adjacent to the first circular hole portion along the axial direction. The inner diameter thread portion being located at an opposite side of the opening portion with respect to the second circular hole portion along the axial direction.

The cap is made of resin material and includes: a planar section that covers the opening portion; and a plurality of pillar sections that extend from the planar section to the inner diameter thread portion along the axial direction and includes a bulge portion which bulges outward in a radial direction of the pulley shaft. The bulge portion is located at a position of the second circular hole portion in a state in which the opening portion is covered by the planar section.

According to the exemplary aspect, the respective pillar sections of the cap made of resin material are inserted in the polygonally-shaped hole portion which is an opening portion of the pulley unit, and the bulge portion is fitted in the second circular hole portion. Therefore, the cap can be easily attached, and then the opening portion of the pulley unit can be prevented from being exposed without using special attachment tools, at low cost.

In addition, the cap is attached in the second circular hole portion formed between the polygonally-shaped hole portion and the inner diameter thread portion. Thus, in the pulley unit with a clutch mechanism, by using the inner diameter thread portion, the cap can be attached on the side of the pulley shaft mounted in the rotation shaft of the vehicle rotating electrical machine. Therefore, a pulley (e.g., an outer pulley of the pulley unit) can be prevented from being subjected to excessive loading. This makes it unnecessary to manage assembly process with high accuracy and to use a dedicated equipment, thereby being able to reduce an increase in cost associated with the attachment of the cap.

The number of sides of the polygonally-shaped hole portion may be equal to the number of the pillar sections. The respective pillar sections may have an outer surface portion that faces the polygonally-shaped hole portion. The outer surface portion may be a planar surface portion that faces an inner surface of polygonally-shaped hole portion and is in contact therewith.

According to this, a planar contact is formed between the polygonally-shaped hole portion and the respective pillar sections where the number of sides of the polygonally-shaped hole portion is equal to the number of the plurality of pillar sections. Thus, the circumferential position of the cap in the polygonally-shaped hole portion can reliably restrained, backlash and rotation of the cap can be suppressed, and the cap can be stably attached over long periods of time.

Each of the plurality of pillar sections may further include a step portion that is formed between the planar surface portion and the bulge portion. The step portion may include a gap that is formed between the respective pillar sections and the first circular hole portion.

According to this, a gap is partially formed between the respective pillar sections and the first circular hole portion. The gap can reduce load acting on the respective pillar sections from the first circular hole portion, thereby being able to reduce occurrence of deformation and permanent set in fatigue of the pillar sections upon a long period of use, and then, attachment of the cap can be maintained over long periods of time.

The polygonally-shaped hole portion may have a regular polygonal shape in cross-section, where each side of the regular polygonal shape corresponds to the respective pillar sections. Therefore, a position capable of attaching the cap can be more increased, and then the cap can be easily positioned upon attaching thereof.

The distance from a center of the cap to the planar surface portion of the respective pillar sections may be equal to a distance from a center in cross-section of the polygonally-shaped hole portion to each side thereof. The width of the respective pillar sections may be determined by the following formula:

$$e = 2d \times \tan(90°/n)$$

where e denotes the width of the respective pillar sections, and n denotes the number of vertexes of the regular polygonal shape in cross-section of the polygonally-shaped hole portion.

According to this, the cap can be fixed, in either: (i) a position where the planar surface portion of the respective pillar sections faces one side of the polygonally-shaped hole portion; and (ii) a position where two circumferential ends of the planar surface portion of the respective pillar sections is in contact with two adjacent side of the polygonally-shaped hole portion, thereby making it possible to further increase a position capable of attaching the cap.

Specifically, as the number of sides of the polygonally-shaped hole portion is more increased (e.g., six or more), circumferential attachment positions of the cap are more narrowly spaced. Therefore, a proper attachment position can be automatically adjusted due to a reaction force of the respective pillar sections, even if the cap is attached in an arbitrary circumferential position.

BRIEF DESCRIPTION OF THE DRAWINGS

In the accompanying drawings:

FIG. 2 is an enlarged cross-sectional view for showing a detail configuration of a pulley unit of FIG. 1;

FIG. 3 is a plane view for showing a detail shape of a cap of FIG. 1;

DETAILED DESCRIPTION OF PREFERRED EMBODIMENTS

Referring to the accompanying drawings, a vehicle rotating electrical machine according to exemplary embodiments of the present invention will now be described below. In the following embodiments, the vehicle rotating electrical machine is applied to a vehicle alternating current (AC) generator.

Figure 1:
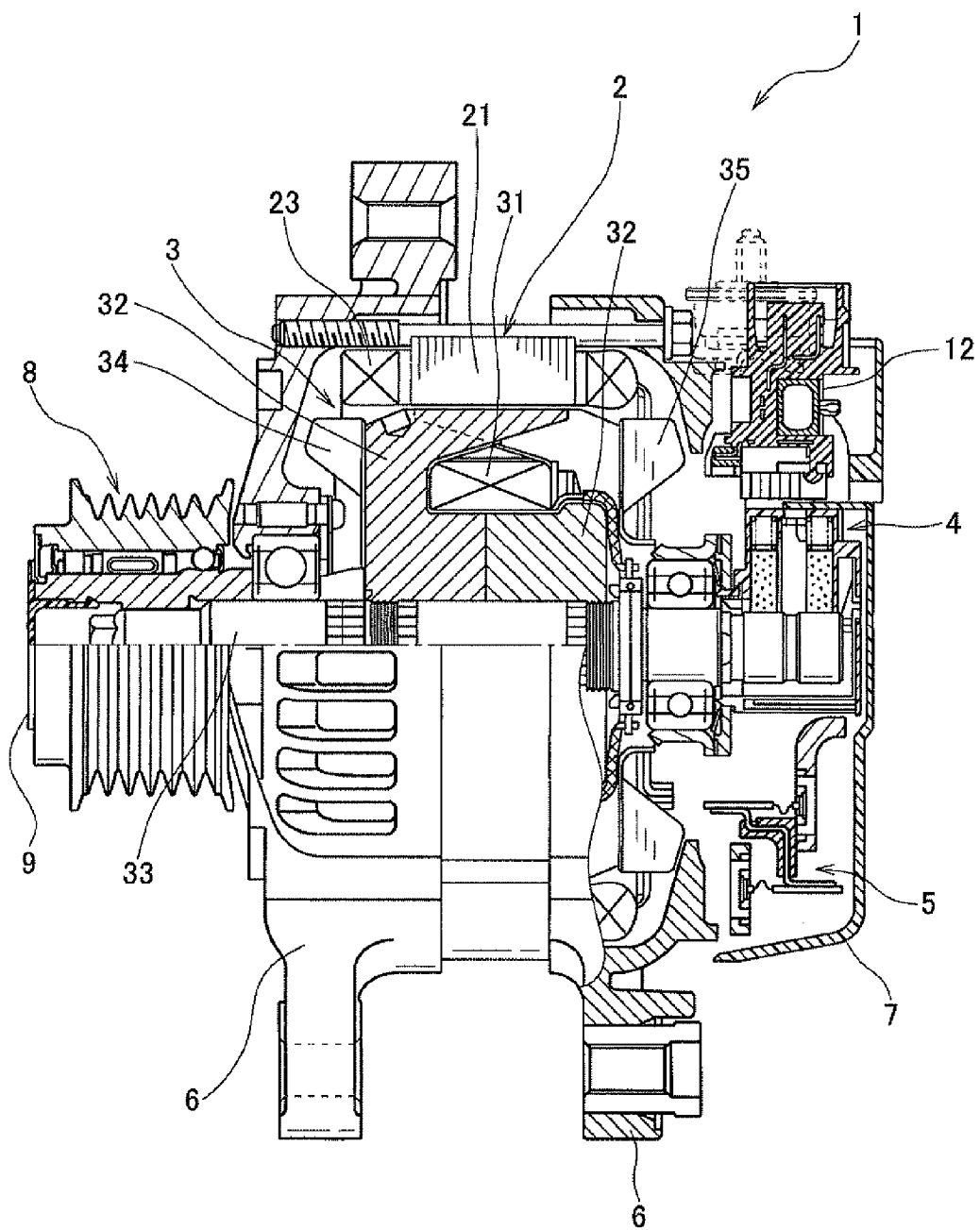
FIG. 1 is a cross-sectional view for showing a configuration of a vehicle AC (alternating current) generator according to an exemplary embodiment of the present invention.

FIG. 1 shows a vehicle AC generator 1 according to one embodiment of the present invention. As shown in FIG. 1, the vehicle AC generator 1 includes a stator 2, a rotor 3, a brush device 4, a rectifier device 5, a frame 6, a rear cover 7, a pulley unit 8 and a cap 9.

The stator 2 includes a stator core 22 and a three-phase stator winding 23. The stator core 22 is cylindrically-shaped and has a plurality of core slots which are circumferentially arranged at predetermined intervals and extends in an axial direction of the stator 2. The three-phase stator winding 23 is wound through the core slots at predetermined intervals.

The rotor 3 includes a field winding 31, a pair of pole cores 32 with a plurality of pole claws, and a rotation shaft 33 attached to the field winding 31 and the pole cores 32. The field winding 31 is made of insulated wire copper wires wounded cylindrically and concentrically with respect to the rotation shaft 33, and is located so as to be sandwiched between the pair of pole cores 32 along an axial direction of the rotation shaft 33. Cooling fans 34 and 35 are fixed to an end surface of the pole cores 32 by welding.

The brush device 4 is configured to pass an excitation current from the rectifier device 5 to the field winding 31 of the rotor 3.

The rectifier device 5 is configured to rectify a three-phase AC voltage outputted from the three-phase stator winding 23 to generate a direct current (DC) voltage.

The frame 6 is configured to hold the stator 2 and the rotor 3. By the frame 6, the rotor 3 is supported rotatably around the rotation shaft 33, and the stator 2 is fixed so as to be disposed at a side of an outer circumference of the pole cores 32 of the rotor 3 through a predetermined gap.

The rear cover 7 is configured to cover all of the brush device 4, the rectifier device 5, and an integrated circuit (IC) regulator 12, which are mounted outside the frame 6 on the rear side, and to protect them.

In the vehicle AC generator 1 having such a structure as explained above, the rotor 3 rotates in a predetermined direction when rotation drive force is transmitted from an engine (not shown) through a belt (not shown) etc. to the pulley unit 8. In this state, by applying an excitation voltage from the outside to the field winding 31 of the rotor 3, the pole claws of the pole cores 32 are energized such that the three-phase AC voltage is generated in the stator winding 23. Thus, the DC voltage is outputted from an output terminal of the rectifier device 5.

FIG. 2 is an enlarged cross-sectional view for showing a detail configuration of the pulley unit 8. The pulley unit 8 includes a pulley shaft 80, a pulley 81, a one-way clutch 82, a ball bearing 83, a roller bearing 84, and annular seals 85, 86 and 87.

The pulley shaft 80 has a hollow cylindrical shape and is mounted in the rotation shaft 33. In an inner peripheral surface 800 of the pulley shaft 80, an inner diameter thread portion 80A and a hexagonally-shaped hole portion 80B is formed. The inner diameter thread portion 80A configures an internal thread (female screw thread) and is disposed at an intermediate area in an axial direction of the pulley shaft 80. The hexagonally-shaped hole portion 80B is disposed at one side (an opposite side of the rotor 3) which configures an opening portion when the pulley unit 8 is mounted in the vehicle AC generator 1. The shape of the inner peripheral surface 800 of the pulley shaft 80 will be described in detail below.

The inner diameter thread portion 80A is used for fixing the pulley unit 8 to the vehicle AC generator 1 by tightening the pulley shaft 80 with respect to an external thread portion (male screw thread) formed at the tip of the rotation shaft 33. This tightening is performed by using a tool (not shown) which has a hexagonally-shaped outside diameter capable of being inserted in the hexagonally-shaped hole portion 80B. The tool is inserted in the hexagonally-shaped hole portion 80B. In this state, the tool is rotated in such a direction that tightens the pulley shaft 80.

The pulley 81 has a pulley groove at the outer peripheral surface thereof which is located concentrically around the outer peripheral surface of the pulley shaft 80. A belt (not shown), which transmits rotation drive force from an engine (not shown) through the pulley unit 8 to the rotation shaft 33, is fitted into the pulley groove. Between the pulley shaft 80 and the pulley 81, the ball bearing 83 and the roller bearing 84 are located at a predetermined interval along an axial direction of the pulley shaft 80.

The ball bearing 83 is located at the side of the rotor 3 and includes a plurality of balls 83A and a retainer 83B for maintaining a constant circumferential distance between the balls 83A. In the present embodiment, a circumferentially-extended orbital groove is formed at the outer peripheral surface of the pulley shaft 80, and a part of the outer peripheral surface of the pulley shaft 80 acts as an inner race (inner ring) of the ball bearing 83. A circumferentially-extended orbital groove is formed at the inner peripheral surface of the pulley 81, and a part of the inner peripheral surface of the pulley 81 acts as an outer race (outer ring) of the ball bearing 83.

The roller bearing 84 is located at the opposite side of the rotor 3 and includes a plurality of cylindrical rollers 84A and a retainer 84B for maintaining a constant circumferential distance between the rollers 84A and for restraining an axial position of the respective rollers 84A. As is the case in the ball bearing 83, a part of the outer peripheral surface of the pulley shaft 80 acts as an inner race (inner ring) of the roller bearing 84, and a part of the inner peripheral surface of the pulley 81 acts as an outer race (outer ring) of the roller bearing 84.

The one-way clutch 82 is inserted in a circumferential position between the pulley shaft 80 and the pulley 81 and in an axial position between the ball bearing 83 and the roller bearing 84. The one-way clutch 82 includes a plurality of cylindrical rollers 82A, a retainer 82B for restraining circumferential and axial positions of the rollers 82A, and an elliptical coil spring 82C which is an elastic member provided for each of the rollers 82A. An outer peripheral surface of the pulley shaft 80 corresponding to the one-way clutch 82 is polygonally-shaped, e.g., hexagonally-shaped. Six wedge-shaped spaces are formed between the hexagonally-shaped outer peripheral surface of the pulley shaft 80 and the cylindrical inner peripheral surface of the pulley 81. The rollers 82A and the coil spring 82C are arranged in each of the six wedge-shaped spaces. The coil spring 82C pushes the rollers 82A to a narrow side (locked side) of the wedge-shaped space.

If a rotational speed of the pulley 81 is equal to or higher than that of the pulley shaft 80 upon rotation of the pulley 81, the rollers 82A are fixed at a position on the locked side of the wedge-shaped space and then the pulley 81 engages with the pulley shaft 80. The rotational drive force of the engine is transmitted from the pulley 81 to the pulley shaft 80, so that the rotor 3 rotates by this rotational drive force.

In this state, when the rotational speed of the engine decrease, the rotational speed of the pulley 81 decreases, but the rotational speed of the pulley shaft 80 does not decrease rapidly due to inertia force of the rotor 3, i.e., the pulley shaft 80 is going to maintain its rotational speed. This enables the circumferential position of the rollers 82A to be shifted from the locked side of the wedge-shaped space, so that the engagement of the pulley 81 with the pulley shaft 80 is released. Thus, the rotational speed of the rotor 3 does not decrease rapidly in association with the pulley 81, but decreases more slowly than that of the pulley 81.

As shown in FIG. 2, in the inner peripheral surface 800 of the pulley shaft 80, a first circular hole portion 80C and a second circular hole portion 80D are also formed between the inner diameter thread portion 80A and the hexagonally-shaped hole portion 80B as explained above. The first circular hole portion 80C has a circular cross-section and is adjacent to the hexagonally-shaped hole portion 80B along the axial direction of the pulley shaft 80. The second circular hole portion 80D has a circular cross-section larger in diameter than that of the first circular hole portion 80C and is adjacent to the first circular hole portion 80C along the axial direction of the pulley shaft 80. An inner diameter of the first circular hole portion 80C is set to be equal to or smaller than an inner diameter of an inscribed circle of the hexagonally-shaped hole portion 80B.

Figure 4:
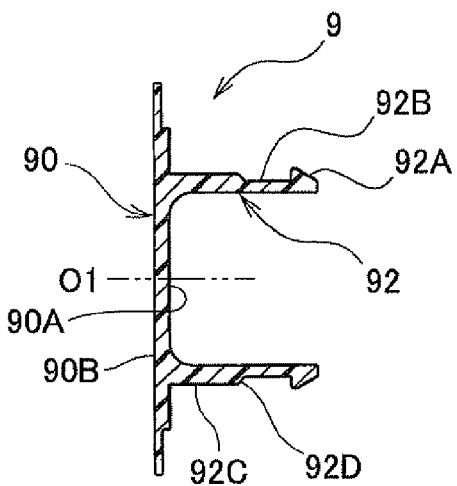
FIG. 4 is a cross-sectional view of the cap taken along the line IV-IV of FIG. 3.
Figure 5:
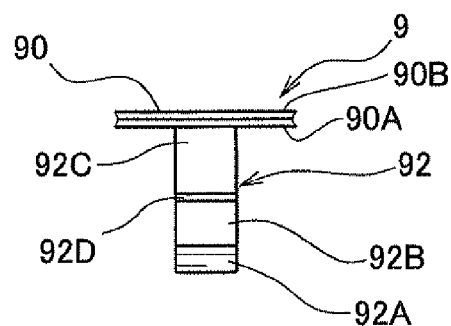
FIG. 5 is a partial side view of the cap viewed from the direction P of FIG. 3.
Figure 8A:
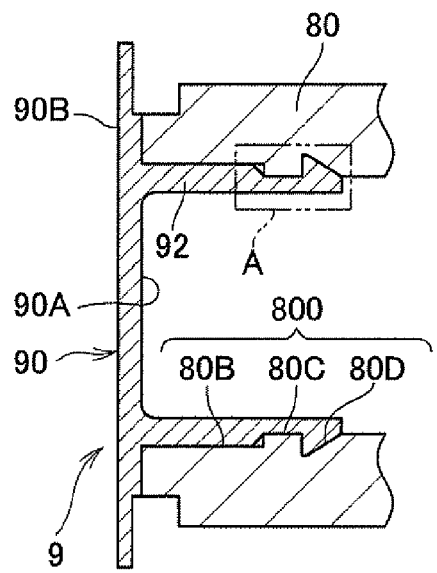
FIG. 8A is a partial cross-sectional view of the cap attached to a pulley shaft of the pulley unit according to the exemplary embodiment.
Figure 8B:
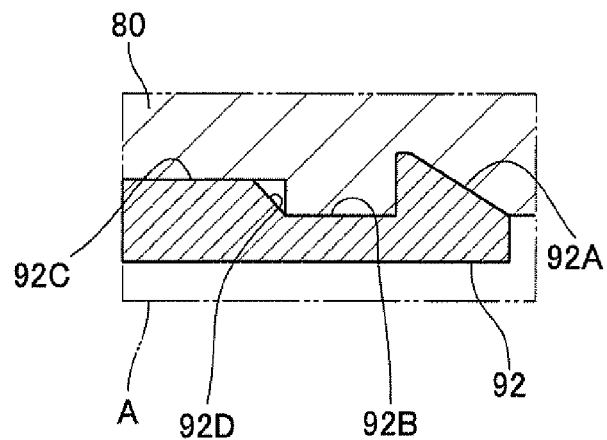
FIG. 8B is an enlarged partial cross-sectional view of a portion A of FIG. 8A.

FIG. 3 is a plane view for showing a detail shape of the cap 9. FIG. 4 is a cross-sectional view taken along the line IV-IV of FIG. 3. FIG. 5 is a partial side view of the cap 9 viewed from the direction P of FIG. 3, FIG. 8A is a partial cross-sectional view of the cap 9 attached to the pulley shaft 80, and FIG. 8B is an enlarged partial cross-sectional view of a portion A of FIG. 8A.

As shown in FIGS. 3-5, 8A and 8B, the cap 9 is made of resin material and includes a planar section 90 and a plurality of pillar sections (a plurality of pillars) 92. The planar section 90 is circularly-shaped and includes an inner surface (back or rear surface) 90A and an outer surface (front surface) 90B. The planar section 90 covers all of an opening portion of the hexagonally-shaped hole portion 80B of the pulley shaft 80. The pillar sections 92 are located on the inner surface 90A of the planar section 90 and are circumferentially arranged at predetermined intervals with respect to a center O1 of the planar section 90. The respective pillar sections 92 axially extends from the planar section 90 to the inner diameter thread portion 80A of the pulley shaft 80 which is covered by the cap 9. The respective pillar sections 92 have a bulge portion 92A that bulges outward in a radial direction with respect to the center O1 of the planar section 90. The bulge portion 92A of the respective pillar sections 92 is arranged at a position corresponding to the second circular hole portion 80D of the pulley shaft 80 when all of the opening portion of the hexagonally-shaped hole portion 80B of the pulley shaft 80 is covered by the planar section 90, as shown in e.g., FIGS. 8A and 8B.

The number of sides of the hexagonally-shaped hole portion 80B is equal to the number of the plurality of pillar sections 92 (i.e., six). An outer portion of the respective pillar sections 92 facing the hexagonally-shaped hole portion 80B is a planar surface portion 92C. This planar surface portion 92C faces an inner surface (planar surface portion) of the hexagonally-shaped hole portion 80B and is in contact therewith. A planar contact is formed between the hexagonally-shaped hole portion 80B and the respective pillar sections 92, where the number of sides of the hexagonally-shaped hole portion 80B is equal to the number of the plurality of pillar sections 92. Thus, the circumferential position of the cap 9 in the hexagonally-shaped hole portion 80B can reliably restrained, backlash and rotation of the cap 9 can be suppressed, and the cap 9 can be stably attached over long periods of time.

The respective pillar sections 92 further have a step portion 92B between the planar surface portion 92C and the bulge portion 92A. In the step portion 92B, a gap 92D is partially formed between the respective pillar sections 92 and the first circular hole portion 80C, as shown in FIGS. 8A and 8B. The gap 92D can reduce load acting on the respective pillar sections 92 from the first circular hole portion 80C, thereby being able to reduce occurrence of deformation and permanent damage due to fatigue of the pillar sections 92 upon a long period of use, and therefore, attachment of the cap 9 can be maintained over long periods of time.

The hexagonally-shaped hole portion 80B has a regular hexagonal shape in cross-section. Each of sides of the regular hexagonal shape in cross-section corresponds to each of the six pillar sections 92. Therefore, a position capable of attaching the cap 9 (six portions along the circumferential direction) can be increased, and then, the cap 9 can be easily positioned upon attaching thereof.

Figure 6:
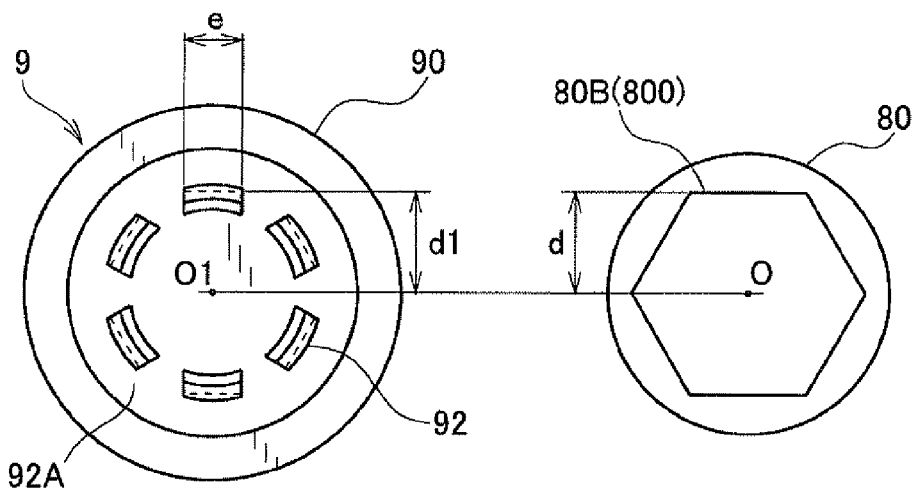
FIG. 6 is a diagram for explaining a dimension of a plurality of pillar sections located in the cap and a dimension of a hexagonally-shaped hole portion of FIG. 3.

FIG. 6 is a diagram for explaining a dimension of a pillar of the cap 9 and the hexagonally-shaped hole portion 80B. As shown in FIG. 6, a distance d1 from a center O1 of the cap 9 (i.e., a center of the six pillar sections 92) to the planar surface portion 92C of the respective pillar sections 92 is equal to a distance d from a center O in cross-section of the hexagonally-shaped hole portion 80B to each side thereof. Preferably, a width e of the respective pillar sections 92 (see FIG. 6) may be determined by the following formula:

$$e = 2d \times \tan(90°/n) \quad (1)$$

where n denotes the number of vertexes of the regular hexagonal shape in cross-section of the hexagonally-shaped hole portion 80B (i.e., n=6).

Figure 7A:
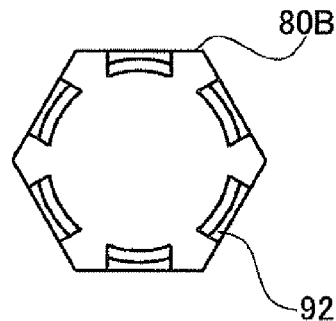
FIGS. 7A and 7B are a diagram for showing the corresponding position of the pillar sections of the cap and the hexagonally-shape hole portion of FIG. 6.
Figure 7B:
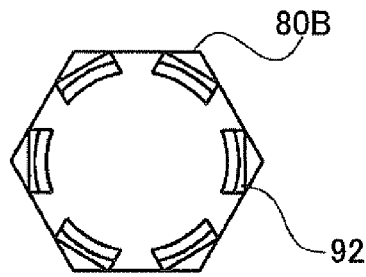

FIGS. 7A and 7B show the corresponding position of the respective pillar sections 92 and the hexagonally-shaped hole portion 80B when the width e of the respective pillar sections 92 is determined by the above formula (1).

FIG. 7A shows a position where the planar surface portion 92C of the respective pillar sections 92 faces one side of the hexagonally-shaped hole portion 80B. FIG. 7B shows a position where two circumferential ends of the planar surface portion 92C of the respective pillar sections 92 is in contact with two adjacent side of the hexagonally-shaped hole portion 80B. In either position shown in FIGS. 7A and 7B, the attachment state of the cap 9 can be stabilized by setting the width e of the respective pillar sections 92 based on the above formula (1). Therefore, a position capable of attaching the cap 9 (i.e., twelve portions along the circumferential direction) can be further increased.

Especially, as the number of sides of the polygonally-shaped hole portion is more increased (e.g., six or more), circumferential attachment positions of the cap 9 are more narrowly spaced. Therefore, a proper attachment position can be automatically adjusted due to reaction force of the respective pillar sections 92, even if the cap 9 is attached in an arbitrary circumferential position.

As explained above, according to the vehicle AC generator 1 of the present embodiment, the respective pillar sections 92 of the cap 9 made of resin material is inserted in the hexagonally-shaped hole portion 80B which is an opening portion of the pulley unit 8, and the bulge portion 92A is fitted in the second circular hole portion 80D. Therefore, the cap 9 can be easily attached, and then, an opening portion (an end surface of the pulley shaft 80 and an inner surface of the hexagonally-shaped hole portion 80B) of the pulley unit 8 can be prevented from being exposed without using special attachment tools, at low cost.

In the vehicle AC generator 1, the cap 9 is attached in the second circular hole portion 80D formed between the hexagonally-shaped hole portion 80B and the inner diameter thread portion 80A. In the pulley unit 8 with a clutch mechanism, by using the inner diameter thread portion 80A, the cap 9 can be attached on the side of the pulley shaft 80 mounted in the rotation shaft 33 of the vehicle AC generator 1. Thus, the pulley 81 can be prevented from being subjected to excessive loading, thereby making it unnecessary to manage assembly process with high accuracy and to use dedicated equipment, thereby being able to reduce an increase in cost associated with the attachment of the cap 9.

The embodiment of the present invention is not limited in any way to the above-described embodiment. Various embodiments are possible as long as the embodiment belongs to the technical scope of the present invention. For example, in the above embodiment, the hexagonally-shaped hole portion 80B, which is a polygonally-shaped hole portion having a regular hexagonal shape in cross-section, is formed in the pulley shaft 80 Instead, the polygonally-shaped hole portion having a regular polygonal shape other than the regular hexagonal shape in cross-section may be formed in the pulley shaft 80. In this case, the number of the pillar sections 92 may be changed in accordance with the number of sides of the regular polygonal shape.

In addition, setting of the width of the pillar sections 92 using the above formula (1) may be applied to each of the pillar sections 92 of the cap 9 corresponding to the polygonally-shaped hole portion having the regular polygonal shape other than the regular hexagonal shape in cross-section.

In the above embodiment, the present invention is applied to the cap structure of the pulley unit 8 mounted in the vehicle AC generator 1, but may be applied to the cap structure of the pulley unit 8 mounted in a vehicle rotating electrical machine other than the vehicle AC generator.

According to the present embodiment, the cap 9 attached to the pulley unit 8 with a clutch mechanism is described, but the present invention may be applied to a pulley unit without a clutch mechanism, in which a polygonally-shaped hole portion for attachment is formed.

As explained above, according to the present embodiment, the respective pillar sections 92 of the cap 9 made of resin material is inserted in the hexagonally-shaped hole portion 80B which configures an opening portion of the pulley unit 8, and the bulge portion 92A is fitted in the second circular hole portion 80D. Therefore, the cap 9 can be easily attached, and then the opening portion of the pulley unit 8 can be prevented from being exposed without using special attachment tools at low cost.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A vehicle rotating electrical machine, comprising:
   a pulley unit that is mechanically connected to a rotation shaft of the vehicle rotating electrical machine, the pulley unit including a pulley shaft and a pulley, the pulley shaft mounting and fixing the rotation shaft, the pulley being located around an outer peripheral surface of the pulley shaft; and
   a cap that covers an opening portion which opens on an axial end surface of the pulley unit,
   wherein
   the pulley shaft has an inner peripheral surface on which a polygonally-shaped hole portion, a first circular hole portion, a second circular hole portion, and an inner diameter thread portion are formed,
   the polygonally-shaped hole portion having a polygonal shape in cross-section perpendicular to an axial direction of the pulley shaft and being located at a side of the opening portion along the axial direction,
   the first circular hole portion having a circular shape in cross-section perpendicular to the axial direction and being adjacent to the polygonally-shaped hole portion along the axial direction,
   the second circular hole portion having a circular shape in cross-section perpendicular to the axial direction larger than the first circular hole portion and being adjacent to the first circular hole portion along the axial direction, and
   the inner diameter thread portion being located at an opposite side of the opening portion with respect to the second circular hole portion along the axial direction,
   the cap is made of resin material and is attached to the pulley shaft, the cap including:
   a planar section that covers the opening portion; and
   a plurality of pillar sections that extend from the planar section to the inner diameter thread portion along the axial direction and include a bulge portion, which bulges outward in a radial direction of the pulley shaft, where the bulge portion is located at a position corresponding to the second circular hole portion in a state in which the opening portion is covered by the planar section,
   each of the plurality of pillar sections further includes a planar surface portion and a step portion, the planar surface portion being an outer surface of the respective pillar section that faces an inner surface of the polygonally-shaped hole portion, the step portion being formed between the planar surface portion and the bulge portion, and
   the step portion includes a gap in the radial direction that is formed between the step portion and the first circular hole portion, the gap extending in the axial direction over the step portion.

2. The vehicle rotating electrical machine according to claim 1, wherein:
   the number of sides of the polygonally-shaped hole portion is equal to the number of the pillar sections;
   the respective pillar sections have the outer surface portion that faces the polygonally-shaped hole portion; and
   the outer surface portion is a planar surface portion that faces an inner surface of polygonally-shaped hole portion and is in contact therewith.

3. The vehicle rotating electrical machine according to claim 1, wherein:
   the polygonally-shaped hole portion has a regular polygonal shape in cross-section perpendicular to the axial direction, where each side of the regular polygonal shape corresponds to the respective pillar sections.

4. The vehicle rotating electrical machine according to claim 3, wherein:
   a distance from a center of the cap to the planar surface portion of the respective pillar sections is equal to a distance from a center in cross-section of the polygonally-shaped hole portion to each side thereof; and
   a width of the respective pillar sections is determined by the following formula:

$$e = 2d \times \tan(90°/n),$$

where e denotes a width of the respective pillar sections, d denotes a distance from a center in cross-section of the polygonally-shaped hole portion to each side thereof, and n denotes a number of vertexes of a regular polygonal shape in cross-section of the polygonally-shaped hole portion.

5. A cap for covering an opening portion of a pulley unit which is mechanically connected a rotation shaft of a vehicle rotating electrical machine,
   the pulley unit including a pulley shaft and a pulley, the pulley shaft mounting and fixing the rotation shaft, the pulley being located around the outer peripheral surface of the pulley shaft the pulley shaft having an inner peripheral surface on which a polygonally-shaped hole portion, a first circular hole portion, a second circular hole portion, and an inner diameter thread portion are formed,
   the polygonally-shaped hole portion having a polygonal shape in cross-section perpendicular to an axial direction of the pulley shaft and being located at a side of the opening portion along the axial direction,
   the first circular hole portion having a circular shape in cross-section perpendicular to the axial direction and being adjacent to the polygonally-shaped hole portion along the axial direction,
   the second circular hole portion having a circular shape in cross-section perpendicular to the axial direction larger than the first circular hole portion and being adjacent to the first circular hole portion along the axial direction, and the inner diameter thread portion being located at an opposite side of the opening portion with respect to the second circular hole portion along the axial direction, the cap being made of resin material and being attached to the pulley shaft, the cap including:

a planar section that covers the opening portion; and a plurality of pillar sections that extend from the planar section to the inner diameter thread portion along the axial direction of the pulley unit and include a bulge portion which bulges outward in a radial direction of the pulley unit, where the bulge portion is located at a position corresponding to the second circular hole portion in a state in which the opening portion is covered by the planar section, each of the plurality of pillar sections further includes a planar surface portion and a step portion, the planar surface portion being an outer surface portion of the respective pillar section that faces an inner surface of the polygonally-shaped hole portion, the step portion being formed between the planar surface portion and the bulge portion, and the step portion includes a gap in the radial direction that is formed between the step portion and the first circular hole portion, the gap extending in the axial direction over the step portion.

6. The cap according to claim 5, wherein:

a number of sides of the polygonally-shaped hole portion is equal to a number of the pillar sections; and the outer surface portion of the respective pillar sections facing the polygonally-shaped hole portion is a planar surface portion that faces an inner surface of polygonally-shaped hole portion and is in contact therewith.

7. The cap according to claim 5, wherein:

the polygonally-shaped hole portion has a regular polygonal shape in cross-section perpendicular to the axial direction, where each side of the regular polygonal shape corresponds to the respective pillar sections.

8. The cap according to claim 7, wherein:

a distance from a center of the cap to the planar surface portion of the respective pillar sections is equal to a distance from a center in cross-section of the polygonally-shaped hole portion to each side thereof; and a width of the respective pillar sections is determined by the following formula:

$$e = 2d \times \tan(90°/n),$$

where e denotes a width of the respective pillar sections, d denotes a distance from a center in cross-section of the polygonally-shaped hole portion to each side thereof, and n denotes a number of vertexes of a regular polygonal shape in cross-section of the polygonally-shaped hole portion.

* * * * *